United States Patent [19]
Firey

[11] Patent Number: 5,931,123
[45] Date of Patent: Aug. 3, 1999

[54] FUEL INJECTOR FOR SLURRY FUELS

[76] Inventor: Joseph C. Firey, P.O. Box 15514, Seattle, Wash. 98115-0514

[21] Appl. No.: 09/146,901

[22] Filed: Sep. 4, 1998

[51] Int. Cl.⁶ .................................................. F02B 45/00
[52] U.S. Cl. .................. 123/25 C; 123/25 R; 123/25 C; 123/23
[58] Field of Search ................................ 123/25 R, 25 A, 123/25 C, 23

[56] References Cited

U.S. PATENT DOCUMENTS

| | | | |
|---|---|---|---|
| 4,558,664 | 12/1985 | Robben | 123/23 |
| 5,162,385 | 11/1992 | McMillian | 123/23 |
| 5,813,379 | 9/1998 | Firey | 123/143 B |

FOREIGN PATENT DOCUMENTS

| | | | |
|---|---|---|---|
| 697298 | 10/1940 | Germany | 123/23 |
| 519098 | 3/1940 | United Kingdom | 123/23 |

*Primary Examiner*—Henry C. Yuen
*Assistant Examiner*—Hal Huynh

[57] ABSTRACT

Fuel injector apparatus is described, for use on internal combustion engines using slurry fuels, wherein a portion of the engine air mass is passed through an aspirator passage shortly prior to combustion and the slurry fuel is aspirated into this air portion. The thusly mixed air and fuel slurry is distributed throughout the engine combustion chamber via several exit channels from the aspirator. The fuel portion of the slurry is reduced to a very small size when the slurry is prepared, and fine atomization of the slurry during injection into the engine is not needed. Hence relatively low velocity slurry injection can be used and injector wear problems greatly reduced.

8 Claims, 5 Drawing Sheets

FUEL INJECTOR FOR SLURRY FUELS

CROSS REFERENCES TO RELATED APPLICATIONS

The invention described herein is partially related to my following U.S. patent applications:

1. "Displacer Jet Igniter", Ser. No. 08/368,093, filed Jan. 3, 1995;
2. "Air Fuel Vapor Stratifier", Ser. No. 08/986,608, filed Dec. 8, 1997;
3. "Stratifier Apparatus for Engines", Ser. No. 09/021,627, filed Feb. 9, 1998;
4. "High Viscosity Fuel Atomizer for Engines", Ser. No. 08/097,565, filed Jun. 15, 1998;

The invention described herein is also partially related to my earlier U.S. Pat. No. 4,653,437, entitled, "Pulverized Char Fuel Injector", issued Mar. 31, 1987;

BACKGROUND OF THE INVENTION

1. Field of the Invention

This invention is in the field of piston and cylinder internal combustion engines and particularly of fuel injectors for injecting slurry fuels into these engines.

2. Description of the Prior Art

Slurry Fuels comprising finely divided coal, suspended and stabilized in water, have been prepared and tested in piston and cylinder, diesel, internal combustion engines of the type used in railroad locomotives. An extensive literature exists describing these coal in water slurry (CWS) fuels, and the experimental results obtained when operating modified railroad locomotive diesel engines on these fuels. Some of this work is summarized in the following references:

A. "Coal Fueled Diesel Engines," edited by M. H. McMillian and H. A. Webb, ASME publication ICE Vol. 7, 1988;

B. "Coal Fueled Diesel Engines 1990," Edited by J. A. Caton, ASME publication ICE Vol 12, 1990;

C. "Coal Fueled Diesel Engines 1991," Edited by J. A. Caton and H. A. Webb, ASME publication ICE Vol. 14, 1991;

D. "Coal Fueled Diesel Engines 1993," Edited by J. A. Caton and H. A. Webb, ASME publication ICE Vol. 19, 1993;

Many of these engine experimental tests used a stabilized slurry of very finely divided coal particles in water with equal weights of coal and water. The finely divided coal was very low in sulfur and ash content. Nevertheless, the engine cylinder and piston rings experienced high wear rates, and the fuel injector nozzles experienced severe wear rates. The injection of such slurry fuels, at high pressure and high velocity, through the small diameter injector nozzles, appeared to cause rapid wear away of the nozzle material. Even when sapphire injector nozzles were used the wear rate, while reduced, was still adversely high.

Much of this prior art work, using coal in water slurry fuels, was sponsored by the U.S. Department of Energy in an effort to develop satisfactory alternative fuels to replace petroleum based fuels. In recent years the U.S. has become increasingly, and heavily, dependent on imported petroleum fuels, thus creating a balance of trade problem, and a national defense weakness. Additionally coal is less expensive per unit of energy than are petroleum derived fuels and fuel cost savings could be achieved by substituting coal water slurry fuels for petroleum fuels. It would thus be desirable to have available a fuel injector system for slurry fuels which did not have the severe injector wear problems of prior art slurry fuel injectors.

3. Definitions

The term piston internal combustion engine is used herein and in the claims to mean an internal combustion engine of the piston and cylinder type, with connecting rod and crankshaft or equivalent, such as the Wankel engine type, or opposed piston type engines, and comprising:

At least one combined means for compressing and expanding gases, each combined means comprising: an internal combustion engine mechanism comprising a variable volume chamber for compressing and expanding gases, and drive means, such as a connecting rod and crankshaft, for driving said internal combustion engine mechanism and varying the volume of said chamber through repeated cycles.

Each variable volume chamber comprises a combustion chamber end at the minimum volume position of the variable volume.

Each variable volume cycle comprises a compression time interval, when said variable volume is sealed and decreasing, followed by an expansion time interval, when said variable volume is sealed and increasing, these two time intervals together being a compression and expansion time interval.

Each combined means for compressing and expanding further comprises intake means for admitting reactant gases into said variable volume chamber prior to each compression time interval and exhaust means for removing reacted gases from said variable volume chamber after each expansion time interval.

Each variable volume cycle further comprises an exhaust time interval, when said variable volume is opened to said exhaust means, followed by an intake time interval, when said variable volume is opened to said intake means, these two time intervals being an exhaust and intake time interval; said exhaust and intake time interval following after a preceding expansion time interval and preceding a next following compression time interval. For a four stroke cycle piston internal combustion engine each separate time interval occupies approximately one half engine revolution and thus one stroke of the piston. For a two stroke cycle piston internal combustion engine the expansion time interval together with the exhaust time interval occupy approximately a half engine revolution and one piston stroke, and an intake time interval followed by a compression time interval occupy the next following half engine revolution and piston stroke.

A piston internal combustion engine further comprises a source of supply of reactant gas containing appreciable oxygen gas to each said intake means for admitting reactant gases into said variable volume chamber.

The combustion time interval is that portion of the compression and expansion time interval when burning of the air fuel mixture in the engine cylinder is intended to take place. For reasons of engine efficiency, this combustion time interval is preferably intended to occur when the variable volume chamber is at or near to its minimum volume, during or following a compression time interval.

The term reactant gas containing appreciable oxygen gas is used herein and in the claims to mean a reactant gas having a ratio of oxygen gas to inert gases at least about equal to that for air, and which may additionally comprise a principal engine fuel.

The term piston crown is used herein and in the claims to mean that portion of the structure of an engine piston on the variable volume side of the piston.

SUMMARY OF THE INVENTION

A slurry fuel injector of this invention comprises an aspirator flow passage, through which a portion of the engine air mass is passed shortly prior to fuel combustion. The slurry fuel is aspirated into this air portion, and the resulting air fuel slurry mixture passes into the engine combustion chamber, via several aspirator exit channels, which distribute this mixture throughout the engine combustion chamber. The subsequent combustion of the fuel portion of the slurry is rapid, since the fuel particles in the slurry are already of a very small size, and present a large external surface area for burning with the surrounding engine air mass. Fuel slurry injection at high pressure and high velocity is thus not necessary since the fuel is finely divided during slurry manufacture. By thus avoiding high pressure and high velocity slurry injection, the injector wear problems of prior art slurry fuel injectors are eliminated by the devices of this invention.

Passing a portion of the engine air mass through the aspirator passage can be accomplished by use of a separate displacer piston and cylinder, enclosing a displacer volume which is filled with the engine air portion to be transferred, the transfer being accomplished by driving the displacer piston into the displacer volume. Alternatively the displacer piston and cylinder can be a part of the engine piston and cylinder.

The air portion transfer is timed to occur shortly prior to the preferred combustion time, near the end of compression. An aspirator valve can be used in the aspirator passage to prevent a flow of hot burned gases through the aspirator passage after combustion occurs.

BRIEF DESCRIPTION OF THE DRAWINGS

A mechanical drive form of slurry fuel injector of this invention is shown schematically in FIG. 1, as installed on a two stroke cycle piston internal combustion engine.

Another mechanical drive form of slurry fuel injector of this invention is shown schematically in FIG. 2, wherein the engine piston is the driver.

Figure 3:
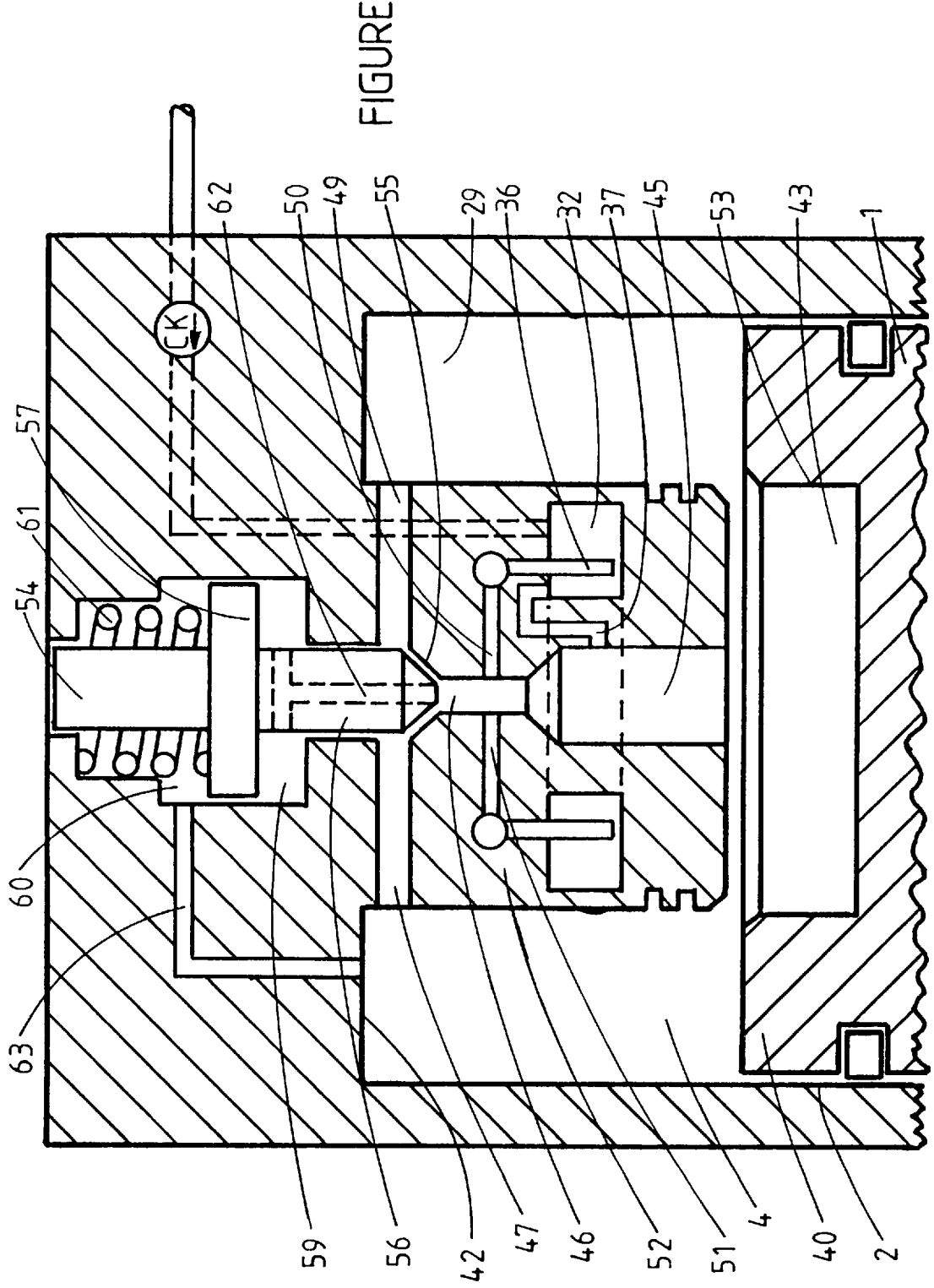

The form of this invention, shown schematically in FIG. 3, uses an aspirator valve to control slurry fuel injection.

Figure 4:
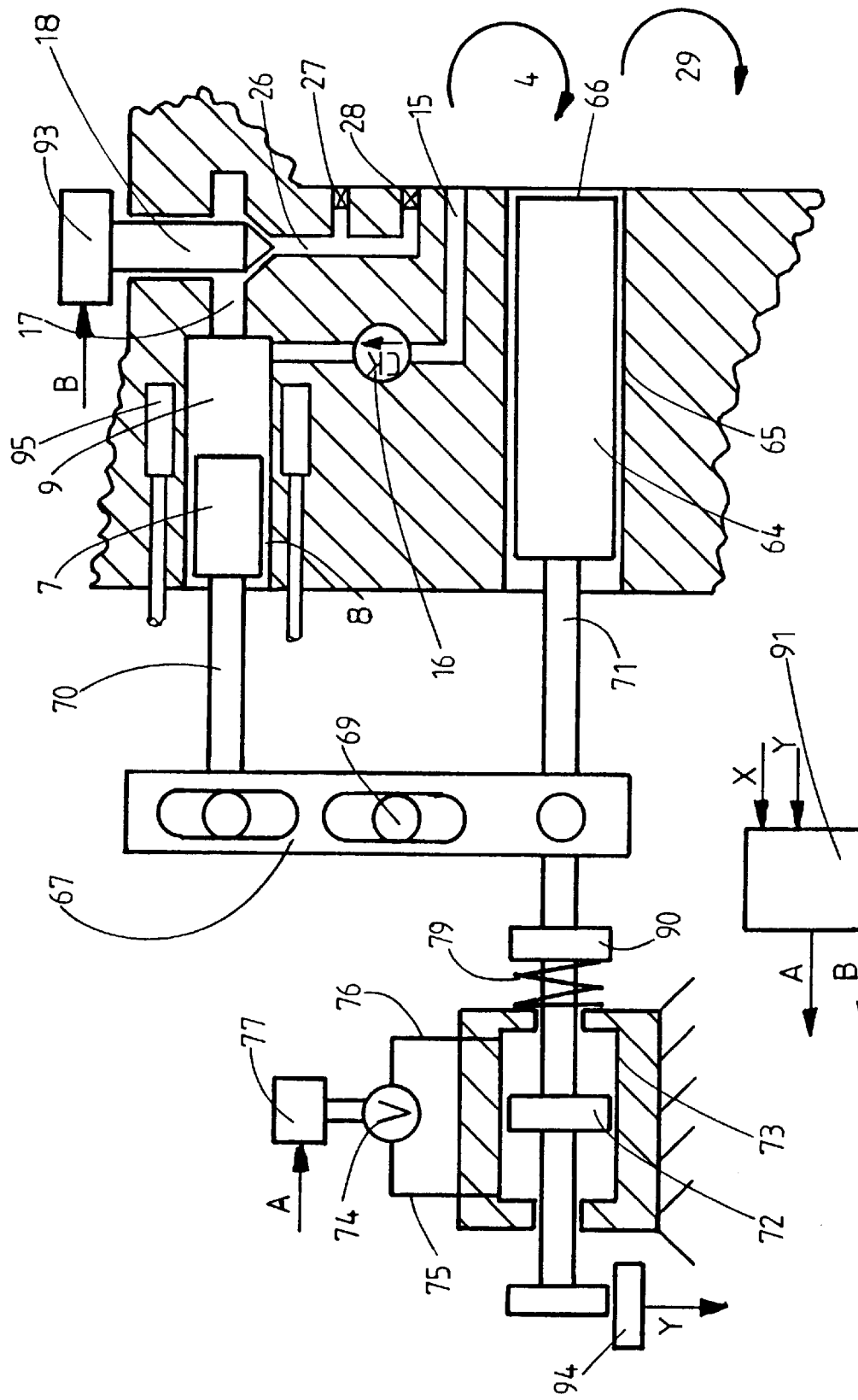

A pneumatic drive form of slurry fuel injector of this invention is shown schematically in FIG. 4.

Figure 5:
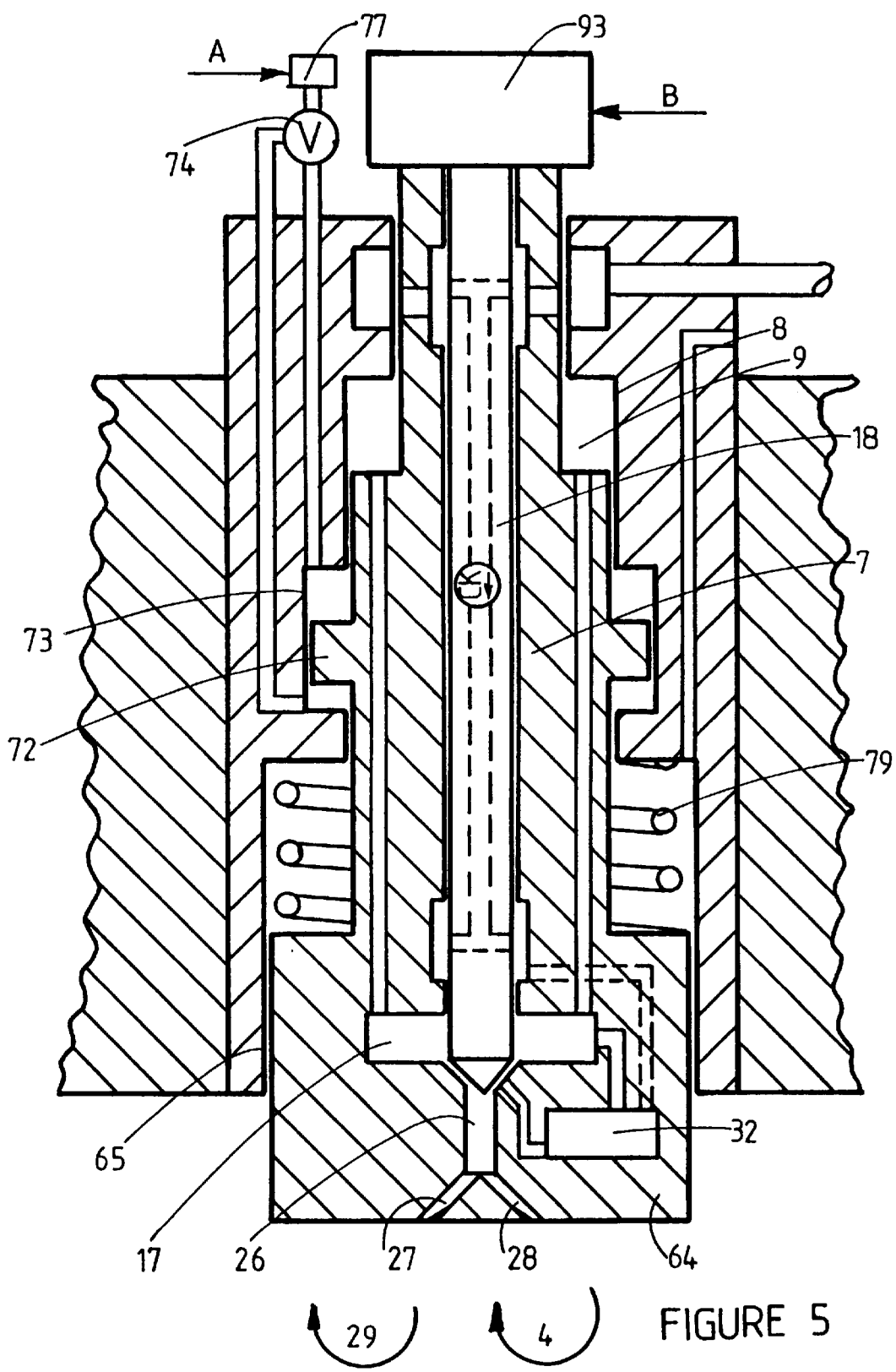

A compact form of the slurry fuel injector of FIG. 4 is shown schematically in FIG. 5.

DESCRIPTION OF THE PREFERRED EMBODIMENTS

A. General Description:

An example of a slurry fuel, suitable for use with the fuel injectors of this invention, is coal in water slurry, wherein very finely divided coal particles are suspended in water, and the slurry stabilized with suitable surfactant and other additives. In effect the fuel component, the coal, is preatomized, outside of the engine, during the slurry preparation process. It is thus not necessary to atomize the slurry, when injecting it into an engine combustion chamber. Slurry injection need only distribute the slurry throughout the air mass inside the engine combustion chamber.

Another example of a slurry fuel, suitable for use with the fuel injectors of this invention, is high viscosity petroleum residual fuels emulsified into water, wherein the water is the continuous phase. Here also the fuel component, the petroleum residual fuel, is preatomized, outside of the engine, during the process of preparing the emulsified slurry fuel.

A slurry fuel injector of this invention comprises an aspirator passage, of reduced flow area, through which a portion of the engine air mass is passed during injection. As this air portion flows through the reduced area of the aspirator passage, its velocity is increased, and its pressure is reduced. This pressure reduction acts upon a metered portion of slurry fuel, in an aspirator fuel cavity, connected, via several ports, to the aspirator passage, and aspirates the slurry fuel into the air portion flowing through the aspirator passage. The resulting mixture of slurry fuel in the air portion is distributed into the other engine air portions via several exit flow passages out of the aspirator passage.

A slurry fuel injector of this invention further comprises a displacer piston, operable within a displacer cylinder, and these enclosing a displacer volume. During the first parts of the engine compression time interval, a portion of the engine air mass is compressed into the displacer volume, with the displacer piston retracted. Injection occurs late during the compression time interval by driving the displacer piston into the displacer volume, to displace the air portion therein, through the aspirator passage, and into the engine combustion chamber via several exit flow passages.

For one form of the invention, the displacer piston and cylinder are separate from the engine piston and cylinder, and have separate drivers and retractors. In another form of the invention, the displacer piston and cylinder are a portion of the engine piston and cylinder, and use the same driver and retractor mechanism as the engine.

In some forms of the invention, an aspirator valve is used, at exit from the aspirator passage, and is closed, after slurry injection, to prevent a backflow of hot burned combustion gases through the aspirator passage, when combustion occurs in the engine combustion chamber, following slurry injection. Preventing such backflow will function, to reduce heat losses into the engine cooling jacket, and thus to increase engine efficiency.

Pressures throughout a slurry fuel injector of this invention are of the same magnitude as the engine combustion chamber pressures, and are thus much lower than the injection pressures used in prior art slurry fuel injectors. Flow velocities of air and slurry through the aspirator can be moderate, and thus can be much lower than the slurry velocities through prior art slurry fuel injectors. Fuel distribution into the engine air mass is accomplished, partly via the several slurry ports into the aspirator passage, and partly via the several exit flow passages out of the aspirator passage. As a result erosive wear of the passages in a slurry fuel injector of this invention will be much slower than that obtained in prior art, high pressure, high flow velocity, slurry fuel injectors. Additionally none of the aspirator flow channels functions in a metering capacity and moderate wear can be tolerated without affecting engine performance and efficiency. These are among the principal beneficial objects of slurry fuel injectors of this invention, that injector wear rate is low and does not greatly affect engine combustion efficiency.

Figure 1:
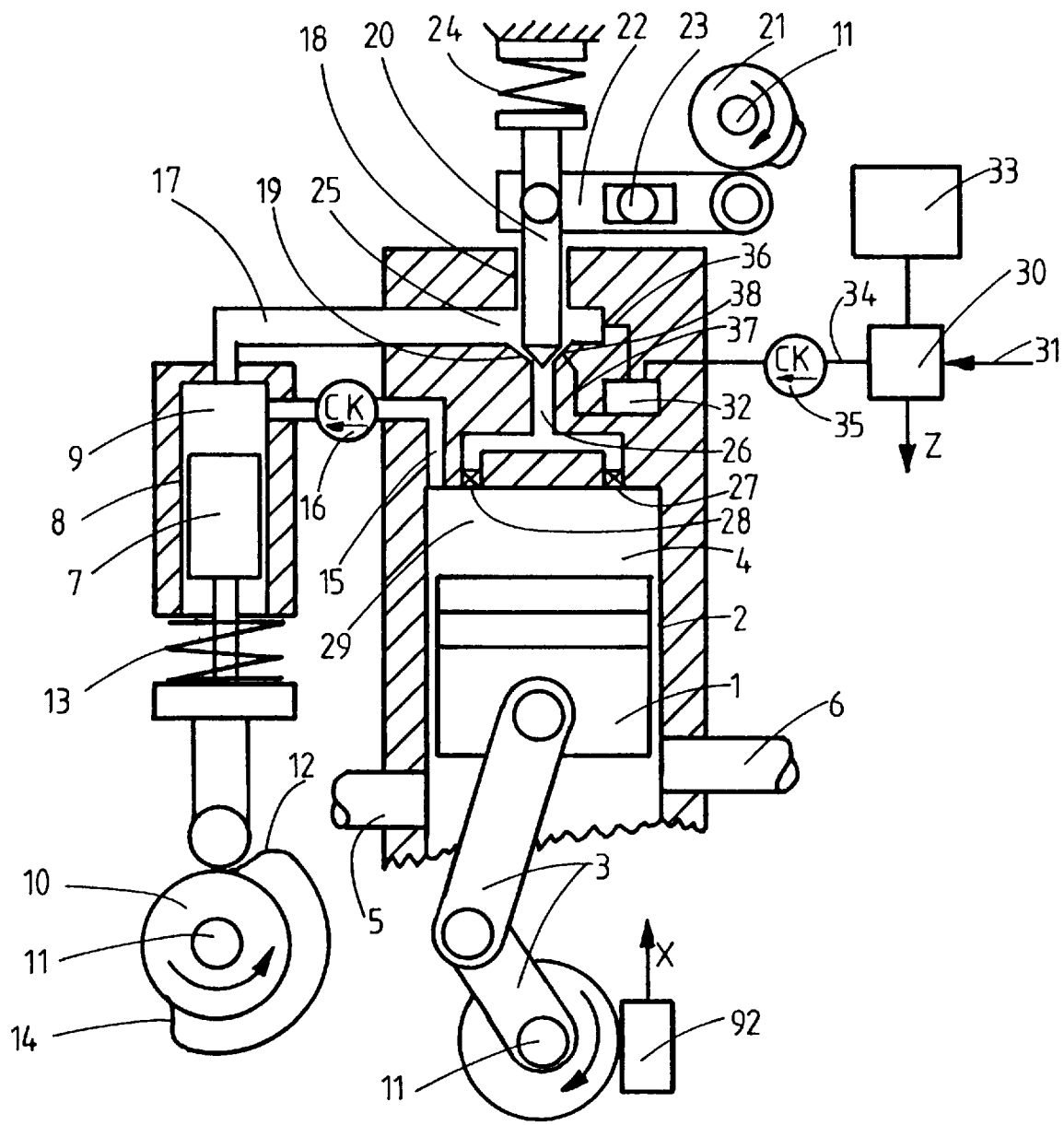

B. Example Slurry Fuel Injector With Separate Displacer:

An example slurry fuel injector of this invention is shown schematically in FIG. 1 in combination with a two stroke cycle, single cylinder, piston and cylinder, internal combustion engine mechanism. The internal combustion engine comprises the following elements:

1. A piston, 1, operates sealably within a cylinder, 2, and is driven by a crank and connecting rod mechanism, 3, to vary the volume of the variable volume chamber, 4, through repeated cycles.

2. An intake means, 5, supplies an engine air mass into the variable volume chamber, 4, during an intake time interval when the intake, 5, is uncovered by the piston, 1, preceding the next compression time interval.

3. An exhaust means, 6, removes reacted gasses from the variable volume chamber, 4, during an exhaust time interval following each expansion time interval when the exhaust, 6, is uncovered by the piston, 1, preceding the next intake time interval.

Each cylinder of an internal combustion engine is fitted with a slurry fuel injector comprising:

4. A displacer piston, 7, operates sealably within a displacer cylinder, 8, and these enclose a displacer volume, 9.

5. The displacer piston, 7, is driven into the displacer volume, 9, by the raised portion, 12, of the driver cam, 10, driven from the engine crankshaft, 11.

6. The displacer piston, 7, is retracted out of the displacer volume, 9, by the spring, 13, and retractor portion, 14, of the cam, 10.

7. The cam, 10, and retractor portion, 14, are timed to retract the displacer piston, 7, out of the displacer volume, 9, during a portion of the engine intake time interval and the first portions of the compression time interval.

8. During the engine compression time interval, a portion of the engine air mass is compressed into the displacer volume, 9, via the entry flow passage, 15.

9. The cam, 10, and driver portion, 12, are timed to drive the displacer piston, 7, into the displacer volume, 9, during the later portions of the engine compression time interval, this displacement of the displacer volume being completed preferably prior to the end of the compression time interval.

10. The check valve, 16, in the entry flow passage, 15, prevents backflow of air from the displacer volume into the variable volume chamber, 4, via the entry flow passage. As a result the portion of the engine air mass, previously compressed into the displacer volume, 9, is forced into the exit flow passage, 17, when the displacer piston, 7, is driven into the displacer volume.

11. The aspirator valve, 18, comprises a valve seat, 19, and moveable valve unit, 20. The aspirator valve, 18, is opened and closed by the valve timer cam, 21, acting via the link, 22, pivoted at point, 23, upon the moveable valve unit, 20, and also by the closing spring, 24.

12. The aspirator valve timer cam, 21, is timed via the engine crankshaft, 11, to open the aspirator valve, 18, during the later part of each compression time interval, when the displacer piston, 7, is being driven into the displacer volume, 9. As a result the air mass portion, previously compressed into the displacer volume, is forced into the variable volume chamber, 4, via the exit flow passage, 17, the aspirator valve inlet, 25, the aspirator valve seat, 19, the aspirator valve outlet, 26, and the two or more injector nozzles, 27, 28, into the combustion chamber end, 29, of the variable volume chamber, 4, during the later part of each compression time interval.

13. The aspirator valve timer cam, 21, is also timed to close the aspirator valve, 18, when the displacer piston, 7, has stopped moving into the displacer volume, 9, having essentially fully displaced the air mass portion out of the displacer volume.

14. The fuel metering pump, 30, transfers a fuel quantity, metered proportionally to an engine torque regulator, 31, into a fuel cavity, 32, from a fuel source, 33, via a fuel supply connection, 34. This fuel transfer is timed to occur only when the aspirator valve, 18, is closed, and preferably during a portion of the engine exhaust and intake time intervals, when pressures in the variable volume chamber, and in the displacer volume, are low. The fuel supply connection, 34, comprises a check valve, 35, to prevent backflow from the fuel cavity when high pressures occur during engine compression and expansion.

15. The fuel cavity, 32, top is connected via a first cavity connection, 36, to the inlet, 25, of the aspirator valve, 18.

16. The fuel cavity, 32, bottom is connected via a second cavity connection, 37, to at least one aspirator valve port, 38, on the aspirator valve seat, 19, a portion of this second cavity connection, 37, being above the level of the top of the fuel cavity, 32.

17. The aspirator valve ports, 38, are positioned on the aspirator valve seat, 19, so that these ports are always open to the aspirator valve inlet, 25, but are open to the aspirator valve outlet, 26, only when the aspirator valve, 18, is opened.

18. When the aspirator valve, 18, is open, an aspirator passage is formed between the moveable valve unit, 20, and the valve seat, 19, at the seat portion where the aspirator ports, 38, are located. The lift of the moveable valve unit, 20, is set so that the flow area of this aspirator passage is less than the flow area of the aspirator valve inlet, 25. Thus when the aspirator valve opens, the air mass portion being displaced therethrough, increases in velocity and decreases in pressure at the aspirator ports. This pressure decrease aspirates the metered fuel quantity out of the fuel cavity, 32, and into the displacing air mass portion, via the aspirator ports, 38, when the aspirator valve, 18, is open and the displacer piston, 7, is being driven into the displacer volume, 9. In this way a mixture of slurry fuel in air is created, and injected into the engine combustion chamber, 29, via the aspirator exit injector nozzles, 27, 28, which distribute this mixture into the engine air mass portion which remained in the variable volume chamber. This injection of the mixture is timed to occur late during each engine compression time interval, so that the subsequent compression ignition and burning of the fuel portions of the slurry fuel will occur, as preferred, during late compression and early expansion.

19. The example slurry fuel injector, shown schematically in FIG. 1, uses a displacer piston and cylinder separate from the engine piston and cylinder and a mechanical driver and retractor of the displacer piston. This FIG. 1 form of the invention also uses an aspirator valve, with mechanical opener and closer, and with the aspirator valve creating the aspirator passage when opened.

20. The volume of the fuel cavity, 32, is somewhat greater than the maximum volume of slurry fuel to be used at maximum engine torque output.

Figure 2:
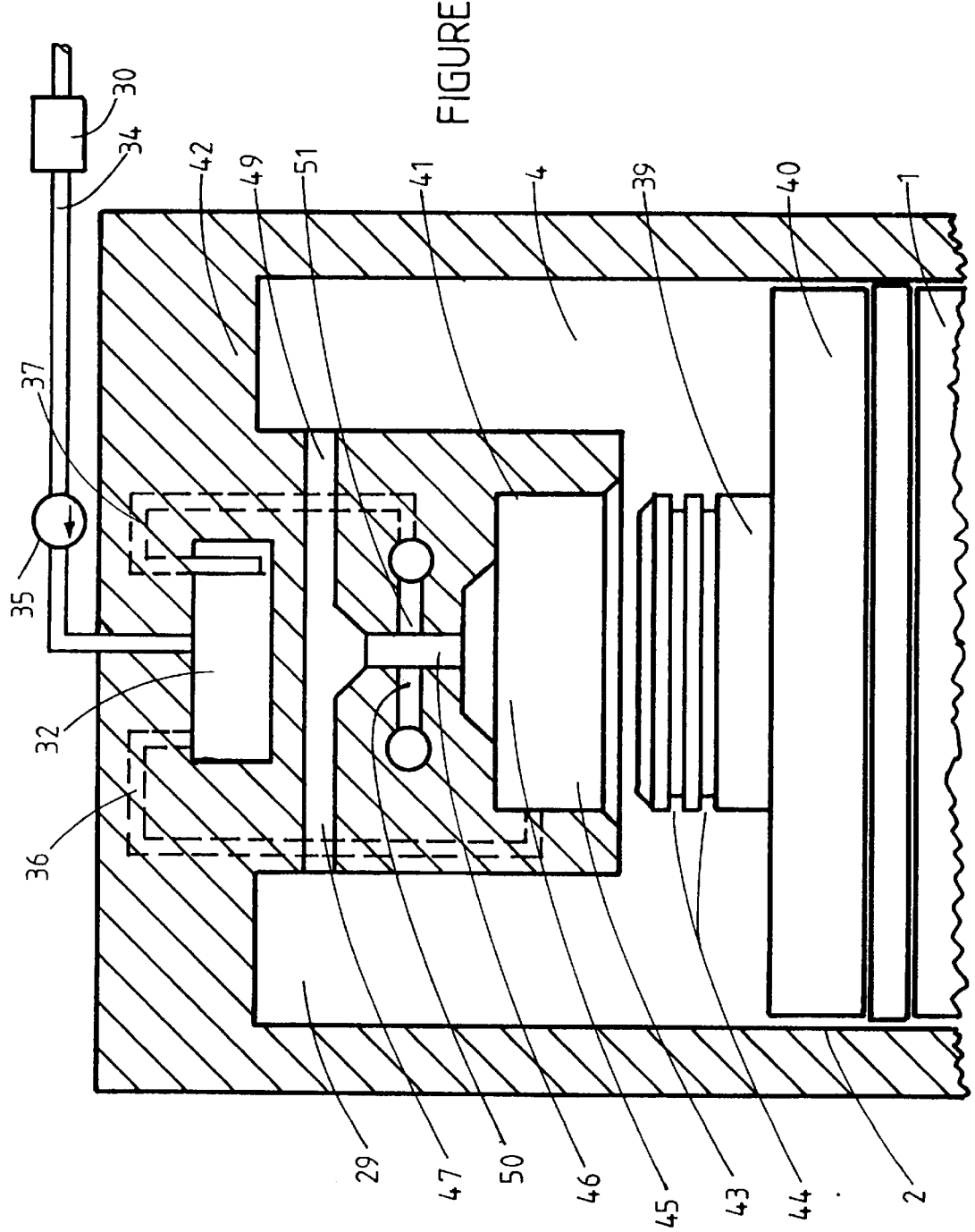

C. Example Slurry Fuel Injector With Integral Displacer:

Another example slurry fuel injector of this invention is shown partially and schematically in FIG. 2 wherein the displacer piston and cylinder are integral with the engine piston and cylinder. This FIG. 2 form of the invention comprises the following elements:

1. The engine piston, 1, and cylinder, 2, are shown with a displacer piston, 39, integral with the crown portion, 40, of the engine piston, 1, and with a displacer cylinder, 41, integral with the head portion, 42, of the engine cylinder, 2.

2. The displacer piston, 39, is positioned relative to the displacer cylinder, 41, so that the displacer piston engages sealably into the displacer cylinder, thus enclosing a displacer volume, 43, late during the engine compression time interval. Labyrinth gland grooves, 44, are shown as one scheme for sealing between the displacer piston and cylinder when these are engaged.

3. As the engine piston, 1, and displacer piston, 39, continue to move toward top dead center, the engine air mass portion enclosed in the displacer volume, 43, is forced into the combustion chamber end, 29, of the variable volume chamber, 4, via the aspirator passage inlet, 45, the aspirator passage, 46, and the several aspirator passage exit passages, 47, 49, in that order. The aspirator passage, 46, flow area is less than the flow area of the aspirator passage inlet, 45. As a result the pressure in the aspirator passage, 46, is less than the pressure in the aspirator passage inlet, 45, and in the displacer volume, 43, since the flow velocity increases into the aspirator passage, during the last part of the engine compression time interval, when the displacer volume air portion is being displaced into the engine combustion chamber.

4. The bottom of the fuel cavity, 32, connects into the several aspirator ports, 50, 51, via the second cavity connection, 37, a portion of which is above the top level of the fuel cavity. The top of the fuel cavity, 32, is connected via a first cavity connection, 36, to the inlet, 45, of the aspirator passage. Thus the pressure drop between aspirator passage inlet, 45, and aspirator passage, 46, at the aspirator ports, 50, 51, acts to force slurry fuel out of the fuel cavity, 32, and into the displacer air mass portion then flowing through the aspirator passage, 46. The resulting mixture of displacer air mass portion and slurry fuel is thus injected into the combustion chamber, 29, and distributed throughout the air mass portion, retained in the variable volume chamber, by the several exit passages, 47, 49, during the last portion of the engine compression time interval.

5. Compression ignition and burning of the fuel in the combustion chamber causes a pressure rise therein. Thus following combustion, and during the early portions of the following engine expansion time interval, when the displacer piston, 39, is being retracted out of engagement with the displacer cylinder, 41, hot burned gases will backflow, from the engine combustion chamber, 29, into the displacer volume, 43, via the exit passages, 47, 49, the aspirator passage, 46, and the aspirator passage inlet, 45, in that order. This backflow will also aspirate any slurry fuel remaining in the fuel cavity.

6. Slurry fuel is replaced into the fuel cavity, 32, via the fuel supply connection, 34, and unidirectional flow check valve, 35, only when no flow is occurring through the aspirator passage, 46. The fuel metering pump, 30, is thus timed to deliver slurry fuel into the fuel cavity only when the displacer piston, 39, is disengaged from the displacer cylinder, 41, and preferably during a portion of the engine exhaust and intake time intervals, when the pressure throughout the variable volume chamber is low.

7. To assure that the displacer volume air mass flows into the engine combustion chamber during injection, the volume ratio of the displacer volume is made greater than the volume ratio of the variable volume chamber, at the start of engagement of the displacer piston into the displacer volume. The volume ratio of the displacer volume is herein and in the claims defined as the ratio of the maximum displacer volume, at the start of engagement of the displacer piston into the displacer cylinder, divided by the minimum displacer volume at the end of the displacement of the displacer volume. The volume ratio of the variable volume chamber is herein and in the claims defined as the ratio of the volume of the variable volume chamber, at the start of engagement of the displacer piston into the displacer cylinder, divided by the minimum variable volume at the end of the compression time interval. This volume ratio requirement assures pressure will tend to rise more rapidly in the displacer volume than in the variable volume during displacement, and thus that the displacer air mass portion will flow into the engine combustion chamber during displacement of the displacer volume.

8. The FIG. 2 form of this invention has the advantage, over the FIG. 1 form of the invention, of greater mechanical simplicity, but suffers the disadvantage of hot burned gas backflow through the aspirator passages, with consequent increased heat loss to the engine cooling jacket.

D. Slurry Fuel Injector With Integral Displacer And Aspirator Valve:

The additional example slurry fuel injector, of this invention, shown partially and schematically in FIG. 3, uses an aspirator valve in combination with the displacer piston and cylinder integral with the engine piston and cylinder, and comprises:

1. The engine piston, 1, and cylinder, 2, are shown with a displacer piston, 52, integral with the head portion, 42, of the engine cylinder, 2, and with a displacer cylinder, 53, integral with the crown portion, 40, of the engine piston, 1.

2. The positioning of the displacer piston and cylinder relative to one another and the enclosing of a displacer volume, 43, when displacer piston and cylinder are sealably engaged is the same for this FIG. 3 form of the invention as for the FIG. 2 form of the invention.

3. The aspirator passage inlet, 45, the aspirator passage, 46, and the several aspirator passage exit passages, 47, 49, are similar in flow areas and functions to these elements and their functions as described hereinabove for the FIG. 2 form of the invention.

4. The fuel cavity, 32, and connections, 36, 37, and aspirator ports, 50, 51 are similar in structure and functions to these elements and their functions, during the engine compression time interval, as described hereinabove for the FIG. 2 form of the invention.

5. This FIG. 3 form of the invention differs from the FIG. 2 form of the invention, in that the displacer piston and displacer cylinder have exchanged positions on the engine piston and cylinder, and that a pneumatically opened and closed aspirator valve, 54, is interposed between the aspirator passage, 46, and the aspirator passage exit passages, 47, 49.

6. The aspirator valve, 54, comprises: an aspirator valve, seat, 55, an aspirator valve moving element, 56, an aspirator valve opener and closer piston, 57, with two sealed pneumatic chambers, an opener chamber, 59, and a closer chamber, 60, and an aspirator valve closer spring, 61.

7. The opener chamber, 59, is connected to the aspirator passage, 46, via the opener connection, 62, and the closer chamber, 60, is connected to the variable volume chamber, 4, at its combustion chamber end, 29, via the closer connection, 63.

8. During the later portion of the engine compression time interval, when the displacer piston, 52, first starts to engage into the displacer cylinder, 53, the closer spring, 61, holds the aspirator valve closed by pressing the moving element, 56, against the seat, 55. As pressure rises more rapidly in the displacer volume, 43, than in the variable volume, 4, during further compression, the aspirator valve is opened, by this pressure difference acting across the opener and closer piston, 57, to overcome the closer spring force. The aspirator valve, 54, is thus opened during the later portions of the combustion time interval during which the engine air mass portion in the displacer volume, 43, flows through the aspirator passage, 46, aspirating slurry fuel out of the fuel cavity, 32, and injecting the resulting mixture of displacer air and slurry fuel into the engine combustion chamber, 29, via the several aspirator exit passages, 47, 49, in the same way as described hereinabove for the FIG. 2 form of the invention.

9. Compression ignition and burning of the thusly injected fuel creates a substantial pressure rise in the combustion chamber, 29, and this pressure rise acts via connection, 63, and closer chamber, 60, to close the aspirator valve, 54, when combustion takes place. In this way backflow of hot burned combustion gases is prevented through the aspirator passages.

10. This FIG. 3 form of the invention has the advantage over the FIG. 2 form of the invention, that backflow of burned gasses through the aspirator passage is prevented, and heat transfer into the engine cooling jacket, with consequent efficiency loss, is reduced. The FIG. 3 form of the invention suffers the disadvantage of the added mechanical complexity of the aspirator valve, as compared to the FIG. 2 form of the invention.

11. During the early part of the engine expansion time interval, the displacer piston, 52, is being retracted out of the displacer volume, 43, and, with the aspirator valve, 54, closed, the pressure in the displacer volume, 43, will decrease more rapidly than the pressure in the variable volume chamber, 4. Thus when the displacer piston, 52, is disengaged from the displacer cylinder, 53, the resulting pressure difference between displacer volume, 43, and variable volume, 4, is quickly equalized via an irreversible throttling process. This throttling process acts to reduce engine power and efficiency.

E. Slurry Fuel Injector With Pneumatic Driver of Separate Displacer:

Another form of the invention is shown schematically and partially in FIG. 4, and FIG. 1, wherein a separate displacer piston and cylinder are driven and retracted pneumatically from the engine cylinder pressures in the variable volume chamber. This FIG. 4 form of the invention comprises the following elements:

1. The displacer piston, 7, displacer cylinder, 8, displacer volume, 9, exit flow passage, 17, aspirator valve, 18, injector nozzles, 27, 28, entry flow passage, 15, with check valve, 16, are similar to, and function similarly to these elements in the FIG. 1, form of the invention except that the aspirator valve, 18, uses a solenoid and spring opener and closer, 93, in this FIG. 4 form of the invention.

2. The driver piston, 64, operates sealably within the driver cylinder, 65, and the pressure within the variable volume chamber, 4, acts on the driver area, 66, of the driver piston, 64. During the pressure rise of the engine compression time interval, the resulting force can act, via the pivoted lever, 67, pivoted at the fixed pivot, 69, and the displacer piston rod, 70, upon the displacer piston, 7, to move the displacer piston, 7, into the displacer volume, 9, during the later part of the compression time interval. The driver piston area is appreciably greater than the displacer piston area.

3. The driver piston rod, 71, connected to the pivoted lever, 67, is also connected to the timer piston, 72, which is sealably operative within the stationary timer cylinder, 73. The timer cylinder, 73, is filled on both sides of the timer piston with an essentially incompressible hydraulic liquid. The timer valve, 74, when open, permits flow of hydraulic fluid, via passages 75, 76, from one side of the timer piston, 72, to the other, and prevents such flow when closed. In this way the actual motion of the driver piston, 64, and thus of the displacer piston, during the compression time interval, can be controlled by the opening or closing of the timer valve, 74, via the timing valve actuator, 77.

4. The retractor spring, 79, acts on the retractor collar, 90, portion of the driver piston rod, 71, to move both the driver piston, 64, and the displacer piston, 7, to retract the displacer piston out of the displacer volume, 9, during the engine intake time interval, when the timer valve, 74, is open.

5. The controller, 9 1, is responsive to the output, x, of the engine cycle timing sensor, 92, shown in FIG. 1, and is operative upon the timing valve actuator, 77, to open timing valve, 74, and also upon the aspirator valve opener and closer, 93, to open aspirator valve, 18, during the later portion of the engine compression time interval, when slurry fuel is to be injected into the combustion chamber, 29, admixed with the engine air mass portion being then displaced out of the displacer volume, 9.

6. The controller, 91, is additionally responsive to the output, y, of the displacer piston position sensor, 94, and is operative upon the timing valve actuator, 77, and the aspirator valve opener and closer, 93, to close the timing valve, 74, and to close the aspirator valve, 18, when the displacer piston, 7, has essentially completely displaced the displacer volume, 9. In this way the displacer piston, 7, is held in this fully displaced position throughout the engine expansion time interval to prevent backflow of hot burned gases into the displacer volume, 9.

7. The controller, 91, is additionally responsive to output, x, of the engine cycle timing sensor, 92, of FIG. 1, to open timer valve, 74, at the start of the engine intake time interval and to close timer valve, 74, at the end of the engine intake time interval, and before the start of the engine compression time interval. Thus during the engine intake time interval the retractor spring, 79, is free to act, to retract the displacer piston, 7, out of the displacer volume, and to return the driver piston, 64, to its starting position for the next engine cycle.

8. The engine air, used to move the driver piston, 64, during the injection time interval remains inside the variable volume chamber, 4, and is thus available for combustion of fuel during the combustion time interval.

9. In some forms of the invention the controller, 91, can be additionally responsive to output, 7, from the fuel metering pump, 30, of FIG. 1, proportional to fuel quantity per engine cycle being transferred into the fuel cavity, and further operative to close the timer valve, 74, during displacer piston retraction, in order to adjust the volume of the displacer volume, 9, in proportion to the fuel quantity per engine cycle. Unneeded compression and injection of displacer volume air mass, and consequent work loss, can thus be avoided for this FIG. 4 form of the invention when displacer volume is thusly proportioned to fuel quantity per engine stroke. This is an advantage of the FIG. 4 form of the invention over the FIG. 1 form of the invention.

F. Compact Slurry Fuel Injector:

Several example forms of this invention are shown schematically in FIG. 1, FIG. 2, FIG. 3, and FIG. 4. The various elements are shown in these schematic diagrams as spread out for clarity and ease of description. But the slurry fuel injectors of this invention can be made reasonably compact and thus useable on small and medium bore diesel engines, as well as on large bore engines. For example, the slurry fuel injector with pneumatic displacer driver, shown in FIG. 5, is a compact form of the slurry fuel injector shown in FIG. 4. In FIG. 5 the driver piston, 64, and the displacer piston, 7, are combined into a single moving unit. Not all elements of the slurry fuel injector are shown in FIG. 5, but those shown are numbered the same as in FIG. 4, and operate similarly as described hereinabove.

G. Sizing:

Values of total air mass per engine cycle, (EAM), and slurry fuel mass per engine cycle, (SFM), are determined by required engine torque output and slurry fuel composition. The distribution of the total air mass, between displacer air mass per engine cycle, (MDA), and the variable volume air mass per engine cycle, (EAM-MDA), needs to be estimated at the start of displacement of the displacer volume by the displacer piston; i.e., at the start of slurry fuel aspiration and injection into the combustion chamber. This air mass ratio, (AMR), equals the ratio of displacer volume to variable volume at the start of displacer volume displacement.

$$(AMR) = \frac{(MDA)}{(EAM - MDA)}$$

This air mass ratio must exceed zero, if slurry fuel aspiration is to occur, and must be less than 1, if an air mass and volume are to exist into which the slurry fuel and displacer air are to injected. When (AMR) is too small the slurry fuel will not penetrate deeply into the combustion chamber, and poor utilization of the available air mass will result. When (AMR) is too large, flow losses of the displacer air mass will reduce engine fuel efficiency.

The optimum value for aid mass ratio, (AMR), is best determined experimentally, on a prototype engine, wherein the (AMR) value can be changed.

The time duration of slurry fuel aspiration and injection, (tA), is to be shorter than the compression ignition time delay interval of the slurry fuel being used. Compression ignition and burning of the injected slurry fuel in the combustion chamber, after the compression ignition time delay, causes an appreciable pressure rise in the combustion chamber. This initial combustion pressure rise could stop displacer air flow, and thus prevent proper completion of slurry fuel injection, if slurry fuel injection time exceeded compression ignition delay time.

The ratio of displacer air mass per engine cycle, (MDA), divided by slurry fuel injection time, (tA), gives an average value of displacer air mass flow rate through the aspirator passage. The ratio of slurry fuel mass per engine cycle, (SFM), divided by slurry fuel injection time, (tA), gives an average value of slurry fuel mass flow rate through the aspirator ports. These displacer air and slurry mass flow rates can be achieved by use of large flow area, with small flow velocity and small aspirator pressure drop, with consequently inadequate penetration of slurry fuel into engine air mass and poor utilization of this air mass. Alternatively these displacer air and slurry mass flow rates can be achieved by use of small flow area, with high flow velocity and high aspirator pressure drop with consequent throttling flow losses, and reduced engine fuel efficiency. The optimum combination of flow areas, flow velocities, and pressure drop is best determined experimentally on a prototype engine, wherein the aspirator passage flow area, and also the slurry fuel port area can be changed. The sizes of these two flow areas can be estimated, for each value of aspirator pressure drop, from the values of mass flow rates, by use of isentropic flow relations for air flow, and incompressible flow relations for slurry flow, which are well known in the prior art of fluid flow.

H. Features Of Various Elements:

The slurry fuel metering pump, 30, is to both meter and time the fuel quantity delivered into the fuel cavity, 32. Examples of metering pumps with timed drive, suitable for use on this invention, are described in the reference, "Fuel Injection And Controls For Internal Combustion Engines," P. Burman and F. De Luca, Simmons - Boardman Publ., New York, 1962, and this material is incorporated herein by reference thereto. Slurry fuel delivery into the fuel cavity is timed to occur, when no gas is flowing through the aspirator passage, and additionally, when no gas will be flowing therethrough between the time of slurry fuel delivery and the start of aspiration and injection. With these fuel delivery timing restrictions, reverse aspiration into the displacer volume is prevented, and aspiration and injection of slurry fuel will be properly timed to occur only during the late portions of the engine compression time interval. Preferably also delivery of slurry fuel is timed to occur when pressures in the displacer volume and variable volume are low, so that high pressure delivery is not needed. Thus the preferred time of slurry fuel delivery into the fuel cavity is during a portion of the engine exhaust and intake time intervals. For slurry fuel injectors, using a separate displacer with an aspirator valve, as in the FIG. 1 example of the invention, slurry fuel delivery is to take place when the aspirator valve is closed, which prevents gas flow through the aspirator passage until aspiration and injection are to take place.

The aspirator ports, through which the slurry fuel is distributed into the displacer air mass during injection, are preferably arranged to achieve this distribution as uniformly as possible into the displacer air. This result can be achieved in various ways, as by use of several aspirator ports distributed around the aspirator passage periphery, or by use of one or more slotted ports whose peripheral dimension exceeds the dimension along the flow direction of air through the aspirator passage.

The aspirator exit passages or injector nozzles through which the mixture of displacer air and slurry fuel is distributed into the engine air mass portion retained in the variable volume chamber, are preferably arranged to achieve this distribution as uniformly as possible, in order to achieve maximum combustion utilization of the available engine air mass. This result can be achieved in various ways, as by use of several exit flow passages or injector nozzles distributed peripherally, or by use of one or more slotted exit flow passages or injector nozzles whose peripheral dimension exceeds the dimension in the direction of the engine piston motion.

The aspirator passage entry and exit preferably have gradual changes of flow area, in order to minimize flow throttling losses therein.

For those forms of the invention using a separate displacer, such as the FIG. 1 form of the invention, an aspirator valve is needed in order to avoid backflow of air through the aspirator passage during the compression time interval. Such backflow, during the compression time interval would cause reverse aspiration of the slurry fuel, necessarily placed in the fuel cavity before or during this compression time interval, and consequent slurry fuel undesired delivery into the displacer volume, instead of into the engine combustion chamber.

It is not necessary to use an aspirator valve in those forms of the invention where the engine piston is also the driver and retractor of the displacer piston and cylinder, such as the FIG. 2 and FIG. 3 forms of the invention. In these forms of the invention, air flow need not occur through the aspirator passage until the displacer piston starts to engage into the displacer cylinder, late during the compression time interval, when aspiration and injection of slurry fuel are intended to occur. Nevertheless an aspirator valve can be used, for these forms of the invention, such as shown in FIG. 3, in order to prevent backflow of hot burned gases through the aspirator passage, following combustion in the variable volume chamber.

Various types of aspirator valve openers and closers can be used for this invention. For the mechanical opener and closer of FIG. 1, the timing of aspirator valve opening and closing is set by the cam, 21, driven from the engine crankshaft, 11, which is thus the engine cycle timing sensor for this mechanical aspirator valve opener and closer. For the pneumatic aspirator valve opener and closer of FIG. 3, the timing of aspirator valve opening and closing is set by the pressure differences between the displacer volume and the variable volume chamber which are thus the engine cycle timing sensor for this pneumatic valve opener and closer. For the solenoid aspirator valve opener and closer of FIG. 4, the timing of aspirator valve opening and closing is set by the controller, 91, in response to the engine cycle timing sensor, 92, shown on FIG. 1.

Various types of displacer piston and cylinder drivers can be used for this invention. The example mechanical displacer piston driver of FIG. 1 uses the cam, 10, with crankshaft, 1, as an engine cycle timing sensor. The example pneumatic displacer piston driver of FIG. 4, is timed by the controller, 91, in response to the engine cycle timing sensor, 92, shown in FIG. 1, and the displacer piston position sensor, 94, as described hereinabove.

Before fuel ignition and combustion can occur the water portion of the slurry fuel needs to be evaporated by transfer of heat from the surrounding engine air mass. This heat transfer and evaporation can be speeded up by increasing the temperature of the engine air mass, as by increasing the residual exhaust gas content thereof, or by preheating the displacer air mass while in the displacer volume. For example, a heating jacket, 95, as shown in FIG. 4, surrounding the displacer volume, 9, can be used as a preheater of displacer air mass, as by flowing engine exhaust gas therethrough.

Having thus described my invention, what I claim is:

1. In a piston internal combustion engine comprising: at least one combined means for compressing and expanding gases, each said combined means comprising an internal combustion engine mechanism comprising a variable volume chamber for compressing and expanding gases, and drive means for driving said internal combustion engine mechanism and varying the volume of said chamber through repeated cycles; said variable volume chamber comprising a combustion chamber end at the minimum volume portion of said variable volume;

each said variable volume cycle comprising a compression time interval, when said variable volume is sealed and decreasing, followed by an expansion time interval, when said variable volume is sealed and increasing, these two time intervals together being a compression and expansion time interval;

each said combined means for compressing and expanding further comprising intake means for admitting reactant gases into said variable volume chamber prior to each said compression time interval, exhaust means for removing reacted gases from said variable volume chamber after each said expansion time interval;

each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, such as air, to each said intake means for admitting reactant gases into said variable volume chamber; each cycle of said variable volume chamber further comprising a potential combustion time interval comprising that portion of said compression and expansion time interval during which fuel from any source, and reactant gas, containing appreciable oxygen gas, are both present within said variable volume chamber; each cycle of said variable volume chamber further comprising a combustion time interval during which the fuel and oxygen contents of the variable volume chamber are ignited and burned therein;

wherein the improvement comprises adding to said piston internal combustion engine at least one fuel injector for slurry fuel for each said variable volume chamber of said piston internal combustion engine, each said fuel injector for slurry fuel comprising:

an engine torque regulator;

a displacer piston sealably operative within a displacer cylinder;

a displacer volume enclosed between said displacer cylinder and said displacer piston;

a displacer piston driver means for moving said displacer piston into said displacer volume;

a displacer piston retractor means for retracting said displacer piston out of said displacer volume;

an exit flow passage from said displacer volume;

a driver timer means for timing the motion of said displacer piston into said displacer volume, so that the contents of said displacer volume are displaced out of said volume, via said exit flow passage, during the latter part of each said combustion time interval;

a retraction timer means for timing the retraction of said displacer piston out of said displacer volume, so that said retraction occurs during a portion of said combined intake and compression time intervals and prior to the commencement of the driver motion of said displacer piston into said displacer volume;

an entry flow passage from said variable volume chamber into said displacer volume, and comprising a unidirectional flow means for controlling flow through said entry flow passage, so that said flow occurs only from said variable volume chamber into said displacer volume;

an aspirator valve, comprising a fixed aspirator valve seat, and a moveable aspirator valve unit;

an aspirator valve opener means for opening said aspirator valve by moving said moveable valve unit away from said aspirator valve seat;

an aspirator valve closer means for closing said aspirator valve by moving said moveable valve unit sealably against said aspirator valve seat;

said aspirator valve further comprising an inlet, connecting to said exit flow passage of said displacer volume, and an outlet;

at least one injector nozzle, connected at outlet to the combustion chamber end of said variable volume chamber, and connected at inlet to said aspirator valve outlet;

an engine cycle timing sensor;

aspirator valve controller means for controlling the opening and closing of said aspirator valve, responsive to said engine cycle timing sensor, and operative upon said aspirator valve opener means and upon said aspirator valve closer means, so that, said aspirator valve is opened during the latter part of each said compression time interval, when said displacer piston is being driven into said displacer volume by said displacer piston driver means, and further so that, said aspirator valve is subsequently closed when said displacer piston stops moving into said displacer volume;

said aspirator valve comprising at least one aspirator port, which is sealed from said aspirator valve outlet, but is open to said aspirator valve inlet, whenever said aspirator valve is closed, and is open to said aspirator valve outlet and said aspirator valve inlet, whenever said aspirator valve is opened;

positioning means for locating said aspirator valve ports so that, the flow area at the aspirator valve ports, is less than the flow area of said aspirator valve inlet whenever said aspirator valve is open;

a source of fuel;

an enclosed fuel cavity, whose internal volume exceeds the maximum fuel volume per engine cycle;

a fuel metering pump means for transferring fuel from said fuel source into said fuel cavity via a fuel supply connection, so that said transfer of fuel takes place only when said aspirator valve is closed, and preferably during a portion of said engine exhaust and intake combined time interval, said fuel supply connection comprising a unidirectional flow means for controlling flow through said fuel supply connection, so that said fuel flow occurs only from said fuel metering pump means into said fuel cavity;

said fuel metering pump means comprising fuel quantity adjustment means for adjusting the fuel quantity transferred, per engine cycle, into said fuel cavity in response to said engine torque regulator;

a first open cavity connection from the top of said fuel cavity to said inlet of said aspirator valve;

a second open cavity connection from the bottom of said fuel cavity to said aspirator valve ports, some portions of this second cavity connection being above the level of the top of said fuel cavity.

2. In a piston internal combustion engine, as described in claim 1, and further comprising:

displacer volume adjustment means for adjusting the volume of said displacer volume while said engine is running;

a fuel quantity sensor means for sensing the fuel quantity transferred, per engine cycle, into said fuel cavity;

a displacer volume controller means for controlling said displacer volume adjustment means, responsive to said fuel quantity sensor means, and operative upon said displacer volume adjustment means, so that, as fuel quantity per engine cycle increases displacer volume increases, and as fuel quantity per engine cycle decreases displacer volume decreases.

3. In a piston internal combustion engine, as described in claim 1, wherein said retraction timer means for timing the retraction of said displacer piston out of said displacer volume, times said retraction to occur during a portion of the combined exhaust, and intake, and compression time intervals.

4. In a piston internal combustion engine comprising: at least one piston and cylinder combined means for compressing and expanding gases, each said combined means comprising an internal combustion engine mechanism comprising a variable volume chamber enclosed between said piston and the cylinder for compressing and expanding gases, and drive means for driving said internal combustion engine mechanism and varying the volume of said chamber through repeated cycles; said variable volume chamber comprising a combustion chamber end at the minimum volume portion of said variable volume;

each said variable volume cycle comprising a compression time interval, when said variable volume is sealed and decreasing, followed by an expansion time interval, when said variable volume is sealed and increasing, these two time intervals together being a compression and expansion time interval;

each said combined means for compressing and expanding further comprising intake means for admitting reactant gases into said variable volume chamber prior to each said compression time interval, exhaust means for removing reacted gases from said variable volume chamber after each said expansion time interval;

each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, such as air, to each said intake means for admitting reactant gases into said variable volume chamber; each cycle of said variable volume chamber further comprising a potential combustion time interval comprising that portion of said compression and expansion time interval during which fuel from any source, and reactant gas, containing appreciable oxygen gas, are both present within said variable volume chamber; each cycle of said variable volume chamber further comprising a combustion time interval during which the fuel and oxygen contents of the variable volume chamber are ignited and burned therein;

wherein the improvement comprises adding to said piston internal combustion engine at least one fuel injector for slurry fuel for each said variable volume chamber of said piston internal combustion engine, each said fuel injector for slurry fuel comprising:

an engine torque regulator;

an enclosed displacer cylinder;

a displacer piston sealably operative within said displacer cylinder whenever engaged thereinto;

a displacer volume, enclosed between said displacer cylinder and said displacer piston whenever said displacer piston is sealably operative within said displacer cylinder;

a driver means for driving said displacer piston and said displacer cylinder into engagement, and for displacing said displacer volume;

a retractor means for retracting said displacer piston and said displacer cylinder apart, to replace said displacer volume, and to retract said displacer piston and said displacer cylinder out of engagement;

said displacer cylinder, and said displacer piston, and said displacer volume, being enclosed between said piston and said cylinder of said piston and cylinder combined mean for compressing and expanding gases;

said driver means for driving said displacer piston and said displacer cylinder and also said retractor means for retracting said displacer piston and said displacer cylinder, are that portion of said drive means for driving said internal combustion engine which varies the volume of said variable volume chamber;

said piston, of said piston and cylinder combined means for compressing and expanding gases, comprising a piston crown, on the variable volume chamber side of said piston;

one of said displacer cylinder and said displacer piston being stationary, and secured to the cylinder head of said cylinder of said piston and cylinder combined means for compressing and expanding gases, at the combustion chamber end of said variable volume chamber;

the other one of said displacer cylinder and said displacer piston being secured to said piston crown of said piston of said piston and cylinder combined mean for compressing and expanding gases, on the variable volume side of said piston crown;

displacer positioning means for positioning said displacer cylinder relative to said displacer piston, so that said displacer piston engages with said displacer cylinder and displaces said displacer volume during the latter portion of said compression time interval, and so that said displacer piston is retracted out of said displacer volume and out of engagement with said displacer cylinder during the first portion of the next following expansion time interval;

said displacer positioning means further positioning said displacer cylinder relative to said displacer piston, so that the volume ratio of said displacer volume is greater than the volume ratio of said variable volume chamber;

an aspirator flow passage, comprising an aspirator inlet, an aspirator throat, and at least one aspirator exit passage, the flow area of said throat being less than the flow area of said inlet;

said aspirator inlet being connected to said displacer volume;

said aspirator exit passages being connected to said variable volume chamber at the combustion chamber end thereof;

a source of fuel;

an enclosed fuel cavity, whose internal volume exceeds the maximum fuel volume per engine cycle;

a fuel metering pump means for transferring fuel from said fuel source into said fuel cavity, via a fuel supply connection, so that said transfer of fuel occurs when said displacer piston is disengaged from said displacer cylinder, and preferably during a portion of said combined exhaust and intake time interval;

said fuel supply connection comprising a unidirectional flow means for controlling flow through said fuel supply connection, so that said fuel flow occurs only from said fuel metering pump means into said fuel cavity;

said fuel metering pump means comprising fuel quantity adjustment means for adjusting the fuel quantity transferred, per engine cycle, into said fuel cavity in response to said engine torque regulator;

at least one aspirator port in said aspirator throat of said aspirator flow passage;

a first open cavity connection from the top of said fuel cavity to said aspirator inlet of said aspirator flow passage;

a second open cavity connection from the bottom of said fuel cavity to said aspirator ports, some portions of this second cavity connection being above the level of the top of said fuel cavity.

5. In a piston internal combustion engine, as described in claim 4, wherein said displacer piston is stationary.

6. In a piston internal combustion engine, as described in claim 4, wherein said displacer cylinder is stationary.

7. In a piston internal combustion engine, as described in claim 4, and further comprising:

an aspirator valve, comprising a fixed aspirator valve seat, and a moveable aspirator valve unit;

an aspirator valve opener means for opening said aspirator valve by moving said moveable valve unit away from said aspirator valve seat;

an aspirator valve closer means for closing said aspirator valve by moving said moveable valve unit sealably against said aspirator valve seat;

said aspirator valve being positioned in said aspirator flow passage between said aspirator throat and said aspirator exit passages;

an engine cycle timing sensor;

aspirator valve controller means for controlling the opening and closing of said aspirator valve, responsive to said engine cycle timing sensor, and operative upon said aspirator valve opener means and upon said aspirator valve closer means, so that, said aspirator valve is opened during the latter part of each said compression time interval, when said displacer piston is being driven into said displacer volume by said displacer piston driver means, and further so that, said aspirator valve is subsequently closed when said displacer piston stops moving into said displacer volume.

8. In a piston internal combustion engine, as described in claim 7, and further comprising:

an entry flow passage from said variable volume chamber into said displacer volume, and comprising a unidirectional flow means for controlling flow through said entry flow passage, so that said flow occurs only from said variable volume chamber into said displacer volume.

* * * * *